(12) United States Patent
Kwon et al.

(10) Patent No.: US 11,976,918 B2
(45) Date of Patent: *May 7, 2024

(54) STRUCTURED LIGHT PROJECTOR AND ELECTRONIC APPARATUS INCLUDING THE SAME

(71) Applicant: SAMSUNG ELECTRONICS CO., LTD., Suwon-si (KR)

(72) Inventors: Namseop Kwon, Suwon-si (KR); Jangwoo You, Seoul (KR); Minkyung Lee, Suwon-si (KR); Byunghoon Na, Suwon-si (KR); Seunghoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 121 days.

This patent is subject to a terminal disclaimer.

(21) Appl. No.: 17/200,073

(22) Filed: Mar. 12, 2021

(65) Prior Publication Data

US 2021/0199426 A1 Jul. 1, 2021

Related U.S. Application Data

(63) Continuation of application No. 16/243,742, filed on Jan. 9, 2019, now Pat. No. 10,982,954.

(30) Foreign Application Priority Data

Jun. 18, 2018 (KR) .......................... 10-2018-0069627

(51) Int. Cl.
*G01B 11/25* (2006.01)
*F21V 5/04* (2006.01)
(Continued)

(52) U.S. Cl.
CPC .......... *G01B 11/2513* (2013.01); *F21V 5/045* (2013.01); *F21V 11/08* (2013.01); *F21V 13/02* (2013.01); *G01B 11/22* (2013.01)

(58) Field of Classification Search
CPC . G02B 3/08; G02B 1/002; G02B 5/08; G02B 5/1809; G02B 5/189; G02B 27/425;
(Continued)

(56) References Cited

U.S. PATENT DOCUMENTS 6,363,046 B1 3/2002 Yoo
9,661,285 B2 5/2017 Miyamae et al.
(Continued)

FOREIGN PATENT DOCUMENTS

CN 101288105 A 10/2008
CN 105700280 A 6/2016
(Continued)

OTHER PUBLICATIONS

Communication dated Jun. 22, 2022 by the China National Intellectual Property Administration for Chinese Patent Application No. 201910135786.0.
(Continued)

*Primary Examiner* — Isiaka O Akanbi
(74) *Attorney, Agent, or Firm* — Sughrue Mion, PLLC

(57) ABSTRACT

A structured light projectors includes an illuminator configured to emit illumination light, a pattern mask configured to project structured light by partially transmitting the illumination light, and a lens configured to project the structured light, wherein the pattern mask includes a first lens distortion compensation region including a plurality of opaque first light shielding patterns having a first pattern width, respectively, and a second lens distortion compensation region surrounding the first lens distortion compensation region, the second lens distortion compensation region including a
(Continued)

plurality of opaque second light shielding patterns having a second pattern width, respectively, wherein the second pattern width is less than the first pattern width.

20 Claims, 21 Drawing Sheets

(51) Int. Cl.
    *F21V 11/08*     (2006.01)
    *F21V 13/02*     (2006.01)
    *G01B 11/22*     (2006.01)

(58) Field of Classification Search
    CPC .. G02B 3/06; G02B 19/0004; G02B 19/0057; G02B 5/008; G01B 11/25; G01B 11/2513; G01B 11/22; G01S 7/4814; G01S 17/48; G03B 21/142; G03B 21/2033; F21V 5/045; F21V 11/08; F21V 13/02
    USPC .......................................................... 356/610
    See application file for complete search history.

(56) References Cited

U.S. PATENT DOCUMENTS

| | | | |
|---|---|---|---|
| 9,846,026 B2 | 12/2017 | Haverkamp | |
| 9,900,565 B2 | 2/2018 | Miyasaka | |
| 10,922,828 B2* | 2/2021 | Han | .................... G06F 3/04886 |
| 11,449,178 B2* | 9/2022 | Han | .................... G03B 21/2066 |
| 2001/0017687 A1 | 8/2001 | Rodriguez et al. | |
| 2002/0177048 A1* | 11/2002 | Saitoh | ....................... G03F 1/36 |
| | | | 430/30 |
| 2005/0195374 A1 | 9/2005 | Akiyama | |
| 2010/0066854 A1 | 3/2010 | Mather | |
| 2010/0284082 A1 | 11/2010 | Shpunt et al. | |
| 2011/0234788 A1 | 9/2011 | Koike et al. | |
| 2012/0170121 A1 | 7/2012 | Okada | |
| 2013/0106692 A1 | 5/2013 | Maizels et al. | |
| 2015/0141267 A1* | 5/2015 | Rothberg | ............. C12Q 1/6874 |
| | | | 250/208.2 |
| 2015/0377414 A1 | 12/2015 | Pirseyedi | |
| 2016/0173855 A1 | 6/2016 | Michel et al. | |
| 2016/0191867 A1 | 6/2016 | Abraham | |
| 2016/0299337 A1 | 10/2016 | Arbabi | |
| 2017/0023780 A1 | 1/2017 | Braker et al. | |
| 2017/0082263 A1 | 3/2017 | Byrnes | |
| 2017/0351111 A1 | 12/2017 | Jeong | |
| 2018/0136480 A1 | 5/2018 | Shimano | |
| 2018/0329118 A1* | 11/2018 | Shimano | ................ H04N 25/61 |
| 2019/0137665 A1* | 5/2019 | You | ......................... G02B 1/002 |
| 2019/0139243 A1* | 5/2019 | You | ......................... G02B 3/0081 |
| 2019/0154877 A1 | 5/2019 | Capasso | |
| 2020/0051263 A1 | 2/2020 | Han et al. | |
| 2022/0373789 A1 | 11/2022 | Arbabi et al. | |

FOREIGN PATENT DOCUMENTS

| | | |
|---|---|---|
| CN | 106990660 A | 7/2017 |
| DE | 102014205705 A1 | 10/2015 |
| JP | 6236975 B2 | 11/2017 |
| KR | 10-1204868 B1 | 11/2012 |
| KR | 10-2015-0035513 A | 4/2015 |
| KR | 10-2016-0120653 A | 10/2016 |
| KR | 10-2016-0135828 A | 11/2016 |
| KR | 10-1698449 B1 | 1/2017 |
| KR | 10-2017-0112915 A | 10/2017 |
| WO | 2007043036 A1 | 4/2007 |
| WO | 2017176921 A1 | 10/2017 |

OTHER PUBLICATIONS

Communication dated Aug. 26, 2019, issued by the European Patent Office in counterpart European Application No. 19154879.1.
Communication dated Oct. 30, 2022, issued by the Korean Intellectual Property Office in Korean Patent Application No. 10-2018-0069627.

* cited by examiner

STRUCTURED LIGHT PROJECTOR AND ELECTRONIC APPARATUS INCLUDING THE SAME

CROSS-REFERENCE TO RELATED APPLICATION

This application is a continuation of U.S. application Ser. No. 16/243,742, filed Jan. 9, 2019, which claims priority from Korean Patent Application No. 10-2018-0069627, filed on Jun. 18, 2018 in the Korean Intellectual Property Office, the disclosure of which is incorporated herein in its entirety by reference.

BACKGROUND

1. Field

Example embodiments of the present disclosure relate to structured light projectors and electronic apparatuses including the same, and more particularly, to structured light projectors having increased brightness uniformity of structured light and electronic apparatuses including the structured light projectors.

2. Description of the Related Art

Recently, in recognition of an object, such as a human or a thing, the necessity of correctly recognizing a shape, a location, or a motion of an object by a precise three-dimensional (3D) image has gradually increased. For this purpose, a 3D sensing technique using structured light has been developed, and as a result, a more precise motion recognition is possible.

Recently, requirements for miniaturization and high resolution of a structured light system have gradually increased in order for the structured light system to be combined with various electronic apparatuses. To manufacture structured light, an optical part, such as a diffractive optical element (DOE) may be generally used. Optical characteristics of the optical part may be factors that affect the degree of precision of designs and manufacturing conditions.

SUMMARY

One or more example embodiments provide structured light projectors having increased brightness uniformity of structured light and electronic apparatuses including the structured light projectors.

Additional aspects will be set forth in part in the description which follows and, in part, will be apparent from the description, or may be learned by practice of example embodiments.

According to an aspect of an example embodiment, there is provided a structured light projector including an illuminator configured to emit illumination light, a pattern mask configured to generate structured light by partially transmitting the illumination light, and a lens configured to transmit the structured light, wherein the pattern mask includes a first lens distortion compensation region including a plurality of opaque first light shielding patterns having a first pattern width, and a second lens distortion compensation region surrounding the first lens distortion compensation region, the second lens distortion compensation region including a plurality of opaque second light shielding patterns having a second pattern width that is less than the first pattern width.

The first lens distortion compensation region may be disposed opposite to a central region of the lens.

The first lens distortion compensation region and the second lens distortion compensation region may be disposed in a concentric circle shape, and the second lens distortion compensation region surrounding the first lens distortion compensation region.

The first lens distortion compensation region may include a first light transmitting slit configured to transmit the illumination light, the first light transmitting slit having a first slit width, and the second lens distortion compensation region may include a second light transmitting slit configured to transmit the illumination light, the second light transmitting slit having a second slit width.

The second slit width of the second light transmitting slit may be greater than the first slit width of the first light transmitting slit.

The structured light projector, wherein a ratio of an area of the second light transmitting slit with respect to an entire area of the plurality of second light shielding patterns in the second lens distortion compensation region may be greater than a ratio of an area of the first light transmitting slit with respect to an entire area of the plurality of first light shielding patterns in the first lens distortion compensation region.

The pattern mask may further include a third lens distortion compensation region surrounding the second lens distortion compensation region, the third lens distortion compensation region including a plurality of opaque third light shielding patterns having a third pattern width, and the third pattern width of the third light shielding patterns being less than the second pattern width of the second light shielding patterns.

The first lens distortion compensation region, the second lens distortion compensation region, and the third lens distortion compensation region may be sequentially disposed in concentric circle shapes.

The first lens distortion compensation region may include a first light transmitting slit configured to transmit the illumination light, the second lens distortion compensation region may include a second light transmitting slit configured to transmit the illumination light, and the third lens distortion compensation region may include a third light transmitting slit configured to transmit the illumination light.

The structured light projector, wherein a ratio of an area of the second light transmitting slit with respect to an entire area of the plurality of second light shielding patterns in the second lens distortion compensation region may be greater than a ratio of an area of the first light transmitting slit with respect to an entire area of the plurality of first light shielding patterns in the first lens distortion compensation region, and a ratio of an area of the third light transmitting slit with respect to an entire area of the plurality of third light shielding patterns in the third lens distortion compensation region may be greater than the ratio of an area of the second light transmitting slit with respect to an entire area of the plurality of second light shielding patterns in the second lens distortion compensation region.

The illuminator may include a plurality of light-emitting elements disposed in a two dimensional array.

The pattern mask may further include a plurality of illumination light non-uniformity compensation regions configured to control brightness of the structured light projected by the pattern mask to be uniform.

The plurality of illumination light non-uniformity compensation regions may be disposed two dimensionally.

The structured light projector, wherein each of the illumination light non-uniformity compensation regions may include a first illumination light non-uniformity compensation sub-region opposite to a brightest region of the illumination light, and a second illumination light non-uniformity compensation sub-region surrounding the first illumination light non-uniformity compensation sub-region.

The first illumination light non-uniformity compensation sub-region may include a plurality of opaque third light shielding patterns having a third pattern width, and the second illumination light non-uniformity compensation sub-region may include a plurality of opaque fourth light shielding patterns having a fourth pattern width, and the fourth pattern width of the plurality of fourth light shielding patterns arranged in the second illumination light non-uniformity compensation sub-region may be less than the third pattern width of the plurality of third light shielding patterns arranged in the first illumination light non-uniformity compensation sub-region.

The first illumination light non-uniformity compensation sub-region may include a plurality of third light transmitting slits configured to transmit the illumination light, the plurality of third light transmitting slits having a third slit width, the second illumination light non-uniformity compensation sub-region includes a plurality of fourth light transmitting slits configured to transmit the illumination light, the fourth light transmitting slits having a fourth slit width, and the fourth slit width of the plurality of fourth light transmitting slits disposed in the second illumination light non-uniformity compensation sub-region may be greater than the third slit width of the plurality of third light transmitting slits disposed in the first illumination light non-uniformity compensation sub-region.

The structured light projector, wherein a ratio of an area of the fourth light transmitting slits in the second illumination light non-uniformity compensation sub-region with respect to an entire area of the plurality of fourth light shielding patterns arranged in the second illumination light non-uniformity compensation sub-region may be greater than a ratio of an area of the third light transmitting slits in the first illumination light non-uniformity compensation sub-region with respect to an entire area of the plurality of third light shielding patterns arranged in the first illumination light non-uniformity compensation sub-region.

The first illumination light non-uniformity compensation sub-region and the second illumination light non-uniformity compensation sub-region may overlap the first lens distortion compensation region and the second lens distortion compensation region, respectively.

The first pattern width of the first light shielding patterns in an area where the first lens distortion compensation region overlaps the first illumination light non-uniformity compensation sub-region may be greater than the first pattern width of the first light shielding patterns in an area where the first lens distortion compensation region overlaps the second illumination light non-uniformity compensation sub-region.

The second pattern width of the second light shielding patterns in an area where the second lens distortion compensation region overlaps the first illumination light non-uniformity compensation sub-region may be greater than the second pattern width of the second light shielding patterns in an area where the second lens distortion compensation region overlaps the second illumination light non-uniformity compensation sub-region.

The pattern mask may have a rectangular shape having rounded corners and convex sides.

The structured light projector may further include a transparent substrate spaced apart from the illuminator, wherein the pattern mask is disposed on a first surface of the transparent substrate and the lens is disposed on a second surface of the transparent substrate, opposite to the first surface.

The lens may include a meta-lens including columns of a nano-size.

According to an aspect of an example embodiment, there is provided an electronic apparatus including a structured light projector, a sensor configured to receive light reflected by an object which is irradiated with light emitted by the structured light projector, and a processor configured to obtain shape information of the object based on the light received by the sensor, wherein the structured light projector includes an illuminator configured to provide illumination light, a pattern mask configured to generate structured light by partially transmitting the illumination light, and a lens configured to transmit the structured light, and wherein the pattern mask includes a first lens distortion compensation region including a plurality of opaque first light shielding patterns having a first pattern width, and a second lens distortion compensation region surrounding the first lens distortion compensation region, the second lens distortion compensation region including a plurality of opaque second light shielding patterns having a second pattern width that is less than the first pattern width.

According to an aspect of an example embodiment, there is provided a structured light projector including an illuminator configured to emit illumination light, a pattern mask configured to generate structured light by partially transmitting the illumination light, a transparent substrate spaced apart from the illuminator, and a lens configured to transmit the structured light, wherein the pattern mask includes a first lens distortion compensation region including a plurality of opaque first light shielding patterns, and a second lens distortion compensation region surrounding the first lens distortion compensation region, the second lens distortion compensation region including a plurality of opaque second light shielding patterns, the plurality of opaque second light shielding patterns being different from the plurality of opaque first light shielding patterns, wherein the pattern mask is disposed on a first surface of the transparent substrate and the lens is disposed on a second surface of the transparent substrate opposite to the first surface.

The plurality of opaque first light shielding patterns may have a first pattern width, respectively, and the plurality of opaque second light shielding patterns may have a second pattern width, respectively, and the second pattern width may be less than the first pattern width.

The pattern mask may further include a plurality of illumination light non-uniformity compensation regions configured to control brightness of the structured light projected by the pattern mask.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
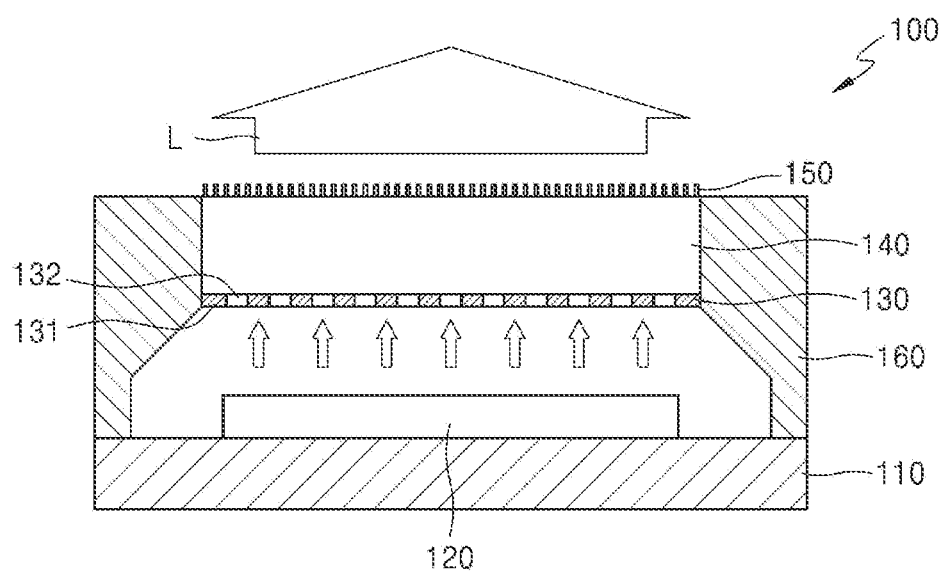
FIG. 1 is a cross-sectional view of a configuration of a structured light projector according to an example embodiment.

Hereinafter, structured light projectors and electronic apparatuses including the structured light projectors will now be described in detail with reference to the accompanying drawings. In the drawings, like reference numerals refer to like elements throughout, and sizes of constituent elements may be exaggerated for clarity and convenience of explanation. In this regard, example embodiments are capable of various modifications and may be embodied in many different forms. Also, in the layer structures described below, it will also be understood that when an element is referred to as being "on" or "above" another element, the element may be in direct contact with the other element or other intervening elements may be present.

While such terms as "first", "second", etc., may be used to describe various components, the above terms are used only to distinguish one component from another. The terms do not mean that materials or structures of elements are different.

Throughout the specification, when a portion "includes" an element, another element may be further included, rather than excluding the existence of the other element, unless otherwise described. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Also, the terms, such as "unit" or "module", should be understood as a unit that performs at least one function or operation and may be implemented in hardware, software, or a combination of hardware and software.

FIG. 1 is a cross-sectional view of a configuration of a structured light projector 100 according to an example embodiment. Referring to FIG. 1, the structured light projector 100 may include an illuminator 120 configured to provide light, a pattern mask 130 configured to form structured light by partially transmitting or shielding incident light, and a lens 150 configured to project structured light. Also, the structured light projector 100 may further include a supporter 110 for supporting the illuminator 120, a transparent substrate 140 for supporting the pattern mask 130 and the lens 150, and a housing 160 for fixing the transparent substrate 140 by separating the transparent substrate 140 from the illuminator 120 by a predetermined distance. A lower part of the housing 160 is arranged on the supporter 110, and the transparent substrate 140 may be fixed on an upper part of the housing 160.

The lens 150 may be arranged on an upper surface of the transparent substrate 140. The lens 150 may be, for example, a meta-lens including minute nano-columns having a nano-size. The nano-columns may have a sub-wavelength size that is less than a wavelength of light emitted from the illuminator 120. For example, a diameter of the nano-columns and an arrangement pitch of the nano-columns may be less than half of a wavelength of light emitted from the illuminator 120. Optical characteristics of the lens 150 may be determined according to the height and diameter of the nano-columns, the arrangement pitch of the nano-columns, and the arrangement of the nano-columns. For example, a plurality of nano-columns may be arranged so that the lens 150 performs as a convex lens or a focusing lens that collects light on a focus plane. When the lens 150 includes nano-columns, the lens 150 may have a relatively very small thickness compared to a general refractive optical lens and may reduce higher order diffraction over a wide angle range compared to a general diffractive optical lens. Accordingly, the structured light projector 100 may have an relatively ultra-small size. For example, the structured light projector 100 may have a height that is less than 4 mm.

The lens 150 may include a material having a refractive index that is greater than that of the transparent substrate 140. For example, the lens 150 may have a refractive index that is greater by 1 or more than that of the transparent substrate 140. A material for forming the lens 150 may include, for example, mono-crystal silicon, poly-crystal silicon Poly Si, amorphous silicon, silicon nitride $Si_3N_4$, gallium phosphide (GaP), titanium dioxide (TiO$_2$), aluminum antimonide (AlSb), alumanylidynearsane (AlAs), aluminium gallium arsenide (AlGaAs), aluminium gallium indium phosphide (AlGaInP), boron phosphide (BP), zinc germanium diphosphide (ZnGeP$_2$), etc. Also, the lens 150 may include, for example, a metal material.

Also, the lens 150 may include a metal material having a relatively high conductivity that may cause surface plasmon excitation. For example, the lens 150 may include copper (Cu), aluminum (Al), nickel (Ni), ferrous (Fe), cobalt (Co), zinc (Zn), titanium (Ti), ruthenium (Ru), rhodium (Rh), palladium (Pd), platinum (Pt), silver (Ag), osmium (Os), iridium (Ir), gold (Au), or an alloy of these metals. The lens 150 may include a two-dimensional material having a relatively high conductivity such as, for example, graphene or a conductive oxide.

The pattern mask 130 may be arranged on a lower surface of the transparent substrate 140 to face the illuminator 120. The pattern mask 130 generates structured light by partially transmitting or shielding light emitted from the illuminator 120. For this purpose, the pattern mask 130 may include opaque light shielding pattern 131 configured to reflect or absorb incident light and light transmitting slits 132 surrounded by the light shielding pattern 131. The light transmitting slits 132 may have transmittance with respect to illumination light emitted from the illuminator 120. Accordingly, the illumination light emitted from the illuminator 120 may be projected to the outside of the structured light projector 100 by the lens 150 through the light transmitting slits 132 and the transparent substrate 140.

Structured light having a predetermined pattern may be formed since a portion of the illumination light provided from the illuminator 120 is shielded by the light shielding patterns 131 and a remaining portion of the illumination light passes through the pattern mask 130. The structured light may be a distribution of beam spots formed by rays of light travelling in a space. The distribution of the beam spots may be determined by a shape of each of the light transmitting slits 132 and an arrangement of the light transmitting slits 132. The structured light may be a mathematically coded pattern so that an angle, a direction, and locational coordinates of the structured light are uniquely designated when bright-and-dark spots of the structured light pass through each point of a focus plane. The coded pattern may be used for recognizing a 3D image. The shape of structured light projected to a 3D object may be changed when reflected by the 3D object, and thus, depth information of a 3D image of the 3D object may be extracted by tracing the degree of change of a shape in each coordinate through imaging the shape change by using an imaging device, such as a camera.

Figure 2:
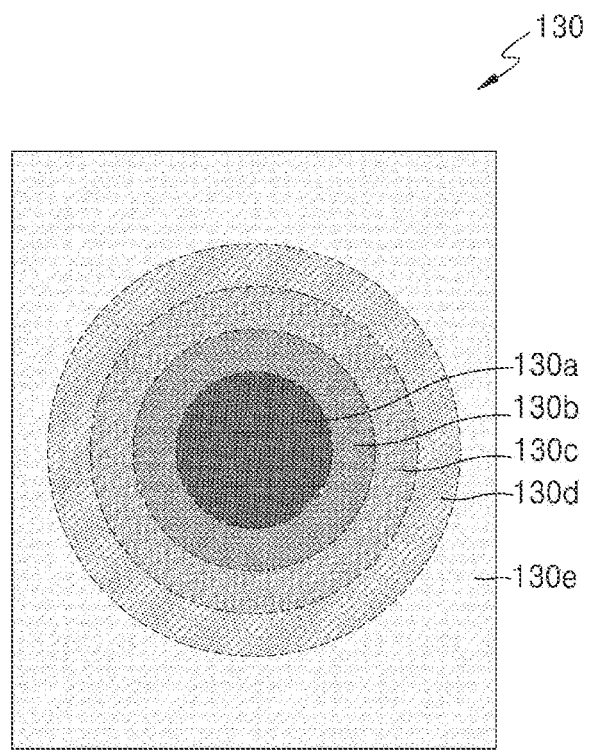
FIG. 2 is a plan view of an example of a pattern mask employed in the structured light projector of FIG. 1.

FIG. 2 is a plan view of an example of the pattern mask 130 employed in the structured light projector 100 of FIG. 1. Referring to FIG. 2, the pattern mask 130 may include an arrangement of the minute light shielding pattern 131 and the plurality of light transmitting slits 132. The shape and arrangement of the light shielding patterns 131 and the light transmitting slits 132 may be variously designed. The pattern mask 130 may be formed such that, for example, after forming a metal layer, a black matrix layer, and a polymer layer, etc. on the lower surface of the transparent substrate 140, the layers are etched.

Figure 3:
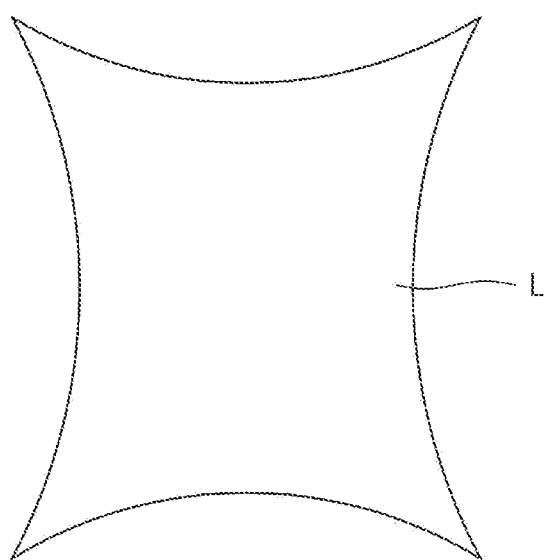
FIG. 3 shows an example cross-sectional shape of structured light projected from a structured light projector when the pattern mask of FIG. 2 is used.

Also, in FIG. 2, as an example, the pattern mask 130 has a rectangular shape. In this case, due to distortion by the lens 150, a cross-sectional shape of the structured light may not be the rectangular shape but be another shape. For example, FIG. 3 shows an example of a cross-sectional shape of structured light projected from the structured light projector 100 when the pattern mask 130 of FIG. 2 is used. Referring to FIG. 3, when the lens 150 has pincushion distortion, corner regions of the structured light L may be expanded and middle regions of sides of the structured light L may have a concave shape. In this example, a central region of the structured light L emitted from a central region of the pattern mask 130 may be relatively bright and edge regions of the structured light L emitted from edge regions of the pattern mask 130 may be relatively dark, and thus, the average brightness of the structured light L may not be uniform according to the regions on the cross-section of the structured light L.

Figure 4:
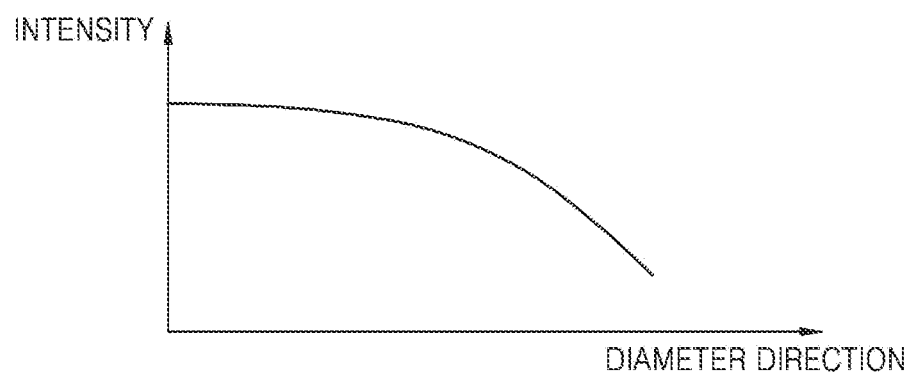
FIG. 4 is a graph showing an example of brightness non-uniformity of structured light due to distortion by a lens.

For example, FIG. 4 is a graph showing an example of brightness non-uniformity of structured light L due to distortion by the lens 150. In FIG. 4, the vertical axis indicates brightness intensity of the structured light L, and the horizontal axis indicates a distance in a diameter direction from the center of the lens 150. When the lens 150 has pincushion distortion, as depicted in FIG. 4, a central region of the structured light L corresponding to the central region of the lens 150 is relatively bright, and the brightness of the structured light L towards the edge regions of the structured light L corresponding to the edge regions of the lens 150 is gradually reduced.

Referring to FIG. 2, the pattern mask 130 may include first lens distortion compensation region 130a, second lens distortion compensation region 130b, third lens distortion compensation region 130c, fourth lens distortion compensation region 130d, and fifth lens distortion compensation region 130e arranged in a concentric circle shape to compensate brightness non-uniformity of the structured light L due to distortion by the lens 150. The first lens distortion compensation region 130a is arranged facing the central region of the lens 150. The second lens distortion compensation region 130b is arranged to surround the first lens distortion compensation region 130a, and the third through fifth lens distortion compensation regions 130c, 130d, and 130e are sequentially arranged on an outer side of the second lens distortion compensation region 130b. In FIG. 2, five lens distortion compensation regions are depicted as an example, but the number of lens distortion compensation regions are not limited thereto and may be selected in various ways according to the degree of distortion of the lens 150.

The plurality of light shielding patterns 131 and the plurality of light transmitting slits 132 are arranged in the first through fifth lens distortion compensation regions 130a, 130b, 130c, 130d, and 130e. In order to compensate for the brightness non-uniformity of the structured light L, the first through fifth lens distortion compensation regions 130a, 130b, 130c, 130d, and 130e may have optical transmittances different from each other. For example, the first lens distortion compensation region 130a may have the lowest optical transmittance, and the optical transmittance of the pattern mask 130 may gradually increase from the second lens distortion compensation region 130b towards the fifth lens distortion compensation region 130e. For this, pattern widths of the light shielding patterns 131 and slit widths of the light transmitting slits 132 in the first through fifth lens distortion compensation regions 130a, 130b, 130c, 130d, and 130e may be different from each other. For example, the pattern width of the light shielding patterns 131 may be gradually reduced and the slit width of the light transmitting slits 132 may be gradually increased from the first lens distortion compensation region 130a towards the fifth lens distortion compensation region 130e.

Figure 5:
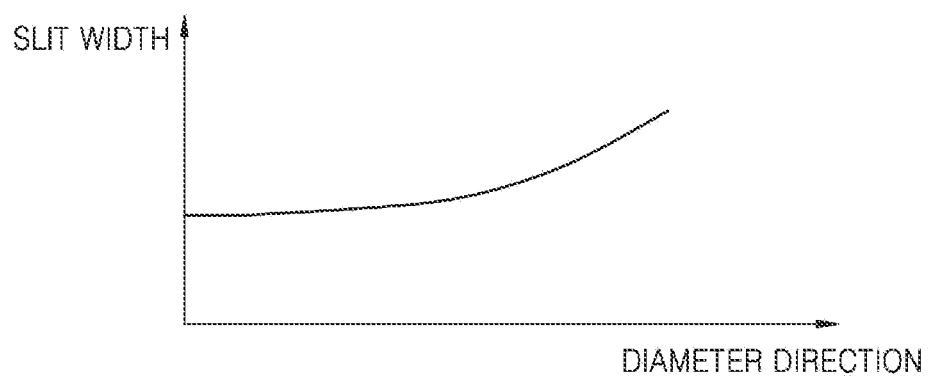
FIG. 5 is a graph showing an example of changing a slit width of a pattern mask for compensating brightness non-uniformity of structured light due to distortion by a lens.
Figure 6:
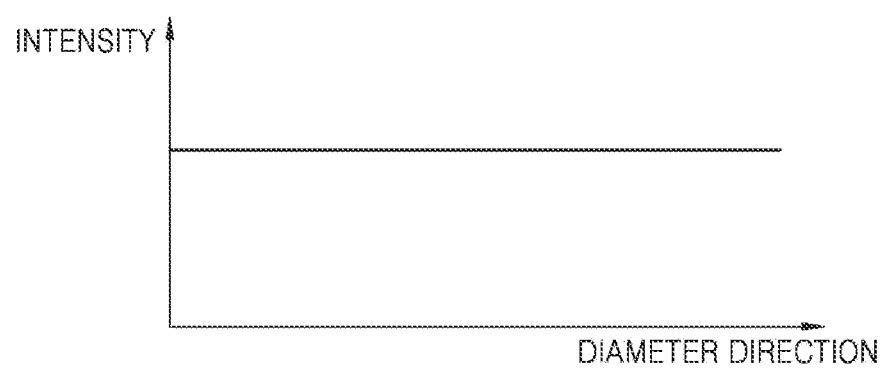
FIG. 6 is a graph showing the change of brightness of structured light, the brightness non-uniformity of which is compensated through changing a slit width of a pattern mask.

FIG. 5 is a graph showing an example of changing a slit width of the pattern mask 130 to compensate brightness non-uniformity of the structured light L due to distortion by the lens 150. FIG. 6 is a graph showing the change of brightness, based on the intensity, of structured light L, the brightness non-uniformity of which is compensated for by changing a slit width of the pattern mask 130. As depicted in FIG. 5, when the slit width of the light transmitting slits 132 is gradually increased from the first lens distortion compensation region 130a of the pattern mask 130 facing the central region of the lens 150 towards the fifth lens distortion compensation region 130e of the pattern mask 130 facing the edge regions of the lens 150, the optical transmittance of the pattern mask 130 may gradually increase from the center of the pattern mask 130 towards edges of the pattern mask 130. In this example, as depicted in FIG. 6, the final structured light L projected from the pattern mask 130 may have a relatively uniform brightness over the entire region of the structured light L. The degree of increasing the slit width of the light transmitting slits 132 from the first lens distortion compensation region 130a towards the fifth lens distortion compensation region 130e may be determined considering the degree of distortion of the lens 150.

Figure 7:
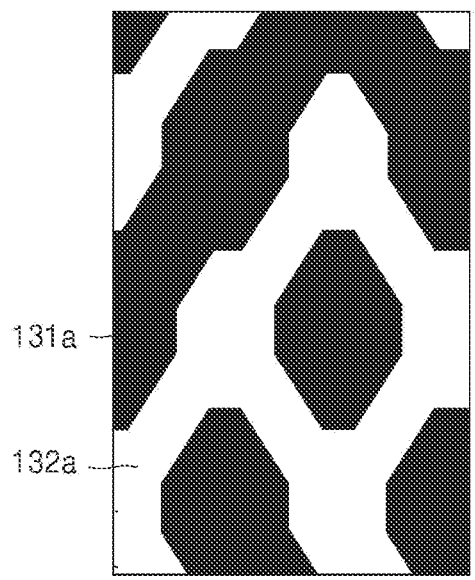
FIGS. 7, 8, and 9 are partial magnified views showing examples of changing pattern widths of light shielding patterns and slit widths of light transmitting slits in each region of a pattern mask.
Figure 8:
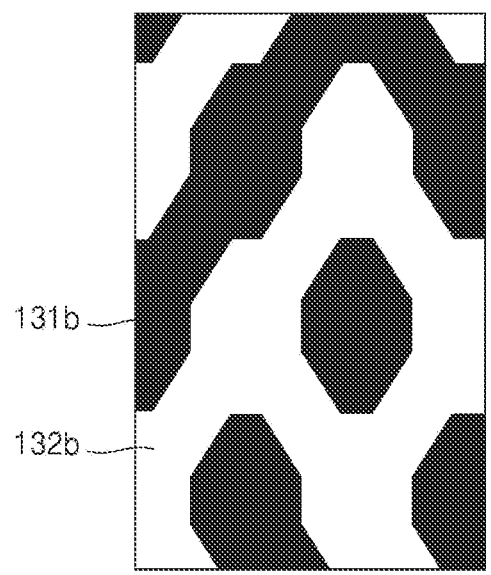
Figure 9:
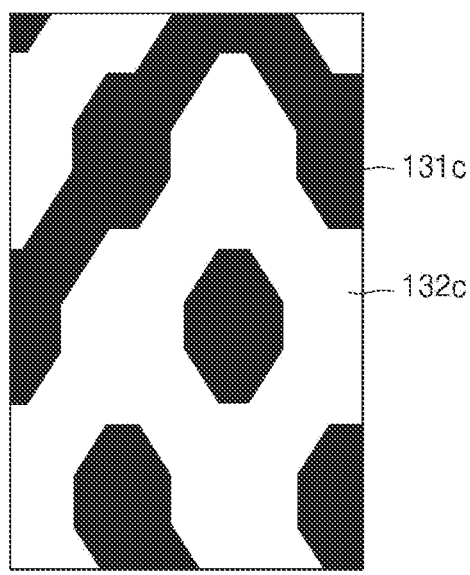

FIGS. 7 through 9 are partial magnified views showing examples of changing pattern widths of the light shielding patterns 131 and slit widths of the light transmitting slits 132 in each lens distortion compensation regions of the pattern mask 130. For example, FIG. 7 shows a pattern width of a first light shielding pattern 131a and a slit width of a first light transmitting slit 132a that are arranged in the first lens distortion compensation region 130a. FIG. 8 shows a pattern width of a second light shielding pattern 131b and a slit width of a second light transmitting slit 132b that are arranged in the second lens distortion compensation region 130b. FIG. 9 shows a pattern width of a third light shielding pattern 131c and a slit width of a third light transmitting slit 132c that are arranged in the third lens distortion compensation region 130c.

Referring to FIGS. 7 through 9, the pattern width of the first light shielding pattern 131a arranged in the first lens distortion compensation region 130a that is located in the center of the pattern mask 130 is greater than that of the second light shielding pattern 131b arranged in the second lens distortion compensation region 130b. On the other hand, the slit width of the first light transmitting slit 132a arranged in the first lens distortion compensation region 130a is less than that of the second light transmitting slit 132b arranged in the second lens distortion compensation region 130b. Accordingly, a ratio of an area of the second light transmitting slit 132b with respect to an entire area of the second light shielding pattern 131b in the second lens distortion compensation region 130b is greater than a ratio of an area of the first light transmitting slit 132a with respect to an entire area of the first light shielding pattern 131a in the first lens distortion compensation region 130a, and thus, the transmittance of the second lens distortion compensation region 130b is greater than that of the first lens distortion compensation region 130a.

Also, the pattern width of the second light shielding pattern 131b arranged in the second lens distortion compensation region 130b is greater than that of the third light shielding pattern 131c arranged in the third lens distortion compensation region 130c located outside of the second lens distortion compensation region 130b. On the other hand, the slit width of the second light transmitting slit 132b arranged in the second lens distortion compensation region 130b is less than that of the third light transmitting slit 132c arranged in the third lens distortion compensation region 130c. Accordingly, a ratio of an area of the third light transmitting slit 132c with respect to an entire area of the third light shielding pattern 131c in the third lens distortion compensation region 130c is greater than a ratio of an area of the second light transmitting slit 132b with respect to the entire area of the second light shielding pattern 131b in the second lens distortion compensation region 130b, and thus, the transmittance of the third lens distortion compensation region 130c is greater than that of the second lens distortion compensation region 130b.

A pattern shape of the pattern mask 130 including the first through fifth lens distortion compensation regions 130a, 130b, 130c, 130d, and 130e may be designed through an image editor. Afterwards, an exposure process may be performed by using an image of the pattern mask 130, and then, the pattern mask 130 may be manufactured through an etching process. When the image of the pattern mask 130 is formed, the slit widths of all of the light transmitting slits 132 and the pattern widths of all of the light shielding patterns 131 may be selected to be the same at an initial stage. Afterwards, the slit widths of the light transmitting slits 132 and the pattern widths of the light shielding patterns 131 may be controlled with respect to each of the first through fifth lens distortion compensation regions 130a, 130b, 130c, 130d, and 130e considering the degree of distortion of the lens 150.

For example, in an initial image of the pattern mask 130, the slit width of all of the light transmitting slits 132 may be selected to be the same slit width as the second light transmitting slit 132b arranged in the second lens distortion compensation region 130b. Afterwards, the slit width of the first light transmitting slit 132a in the first lens distortion compensation region 130a may be reduced, and the slit width of the third light transmitting slit 132c in the third lens distortion compensation region 130c may be increased. Also, the pattern width of the first light shielding pattern 131a in the first lens distortion compensation region 130a may be increased, and the pattern width of the third light shielding pattern 131c in the third lens distortion compensation region 130c may be reduced.

Figure 10:
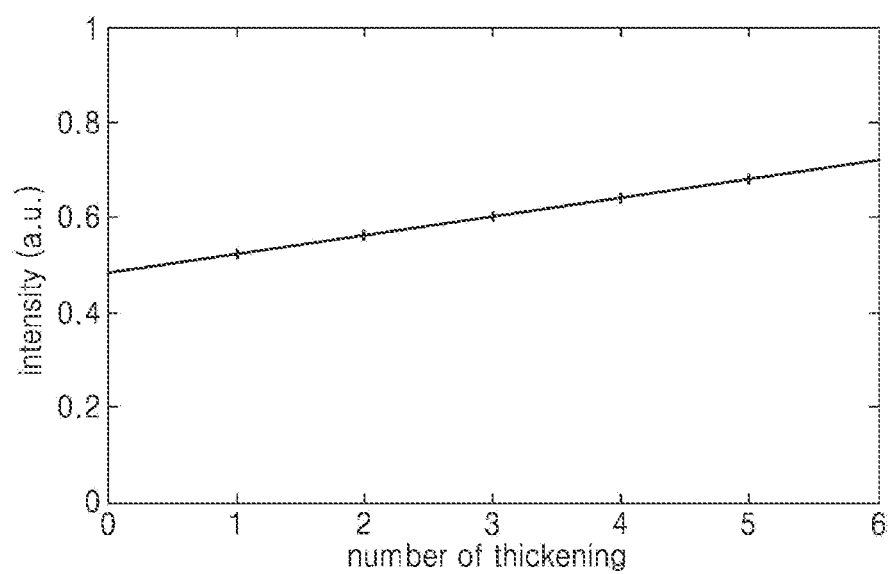
FIG. 10 is a graph showing the change of brightness of structured light according to the increase in a slit width.
Figure 11:
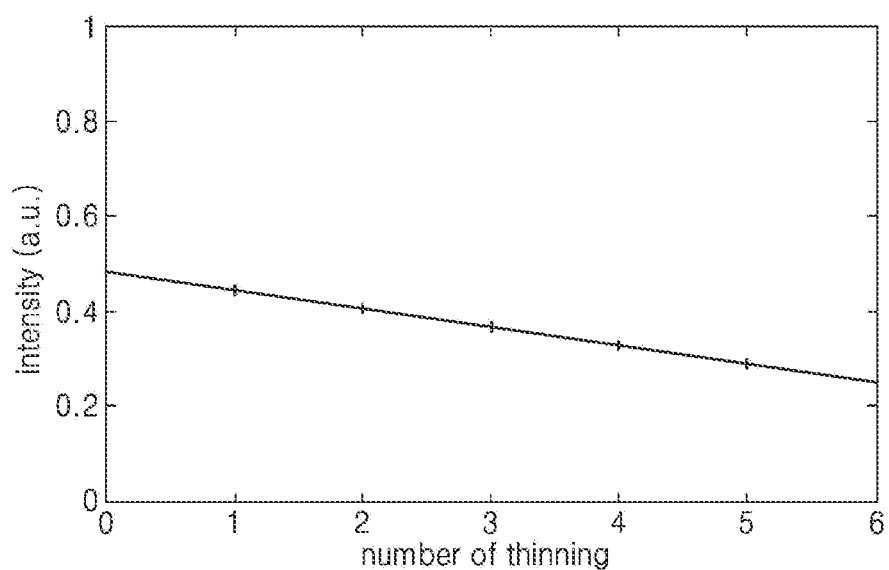
FIG. 11 is a graph showing the change of brightness of structured light according to the decrease in a slit width.

A unit for controlling the pattern widths of the light shielding patterns 131 and the slit widths of the light transmitting slits 132 may be a single pixel of the image editor. For example, the pattern widths of the light shielding patterns 131 and the slit widths of the light transmitting slits 132 may be increased or reduced by a pixel unit of the image editor. For example, FIG. 10 is a graph showing the change of brightness of structured light according to the increase in a slit width. FIG. 11 is a graph showing the change of brightness of structured light according to the decrease in a slit width. In FIGS. 10 and 11, the figures of horizontal axes indicate the number of pixels that controlled a slit width. As depicted in FIG. 10, when the slit width is increased pixel by pixel, the brightness of structured light is gradually increased. Also, as depicted in FIG. 11, when the slit width is reduced pixel by pixel, the brightness of the structured light is gradually reduced. Accordingly, the number of pixels for controlling the pattern widths of the light shielding patterns 131 and the slit widths of the light transmitting slits 132 in the first through fifth lens distortion compensation regions 130a, 130b, 130c, 130d, and 130e may be determined considering the degree of distortion of the lens 150 and the brightness change of the structured light according to the control of pixels described above.

Figure 12:
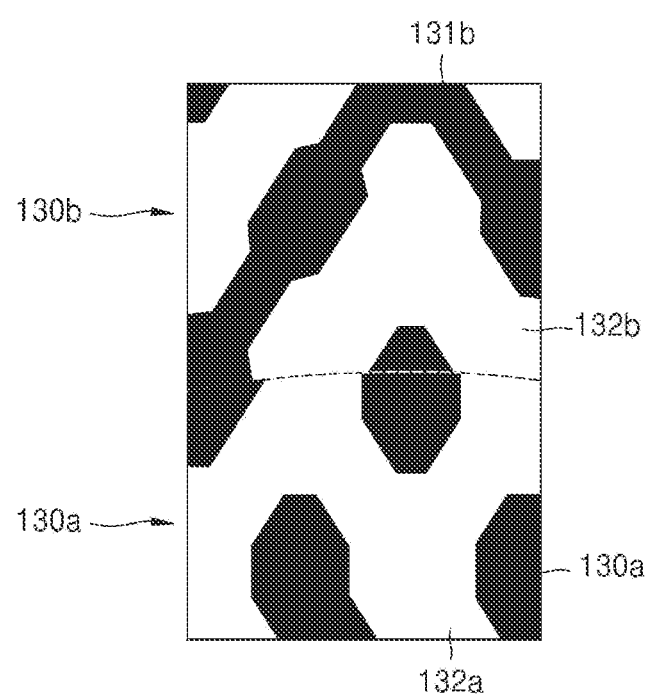
FIG. 12 is a partial magnified view showing an example of changing a pattern width of light shielding patterns and a slit width of light transmitting slits at a boundary between two regions of a pattern mask.

The pattern widths of the light shielding patterns 131 and the slit widths of the light transmitting slits 132 may be changed in a step form in the first through fifth lens distortion compensation regions 130a, 130b, 130c, 130d, and 130e. For example, FIG. 12 is a partial magnified view showing an example of changing a pattern width of the light shielding patterns 131 and a slit width of light transmitting slits 132 at a boundary, shown by the dotted line, between two regions of the pattern mask 130. Referring to FIG. 12, the light shielding patterns 131 and the light transmitting slits 132 may be arranged extending over the first and second lens distortion compensation regions 130a and 130b. In this case, at a boundary between the first and second lens distortion compensation regions 130a and 130b, the pattern width of the light shielding patterns 131 may be discontinuously reduced in a step form and the slit width of the light transmitting slits 132 may be discontinuously increased in a step form.

Figure 13:
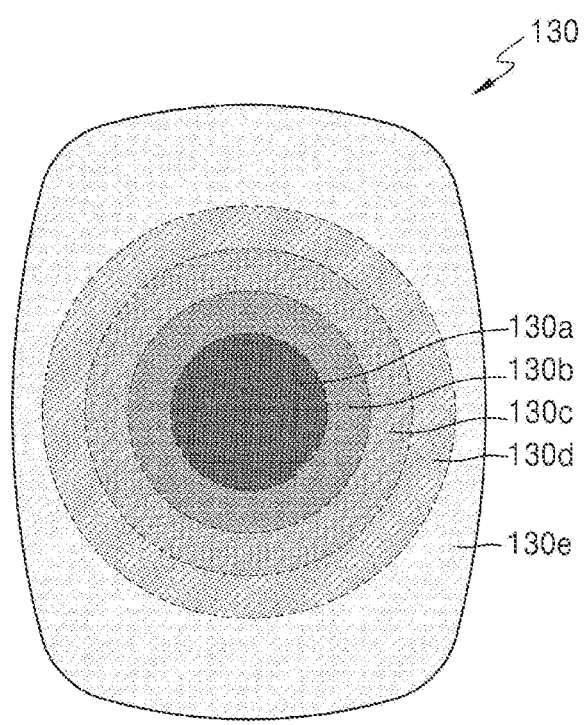
FIG. 13 is a plan view of another example of a pattern mask employed in the structured light projector of FIG. 1.
Figure 14:
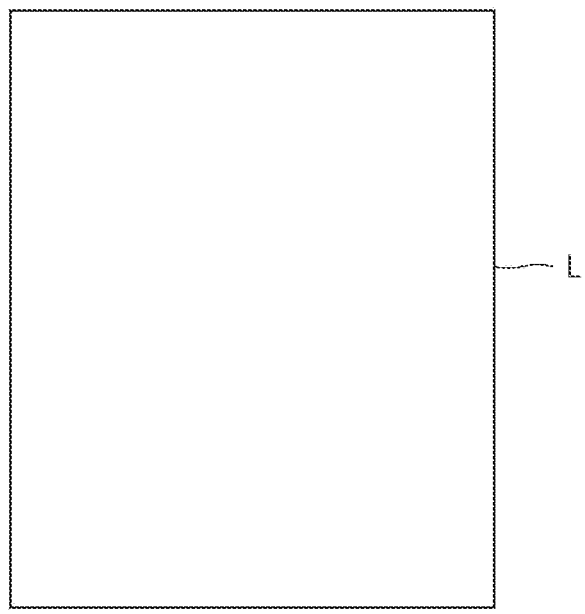
FIG. 14 shows an example of a cross-sectional shape of structured light projected from a structured light projector when the pattern mask of FIG. 13 is used.

FIG. 13 is a plan view of another example of the pattern mask 130 employed in the structured light projector 100 of FIG. 1. FIG. 14 shows an example of a cross-sectional shape of structured light projected from the structured light projector 100 when the pattern mask 130 of FIG. 13 is used. Referring to FIG. 13, corner regions of the pattern mask 130 may be rounded and a middle region of each side of the pattern mask 130 may have a convex shape considering the distortion of the lens 150. Thus, in the case when the lens 150 has pincushion distortion, the corner regions of the pattern mask 130 may expand and the middle regions of the sides of the pattern mask 130 may have a concave shape, and thus, as depicted in FIG. 14, the structured light L projected from the pattern mask 130 may have a rectangular shape.

Also, in this case, a central region of the structured light L emitted from the central region of the pattern mask 130 may be relatively bright, and edge regions of the structured light L emitted from edge regions of the pattern mask 130 may be relatively dark. Thus, the average brightness of the structured light L on a cross-section of the structured light L may not be uniform. Accordingly, the pattern mask 130 depicted in FIG. 13 may also include the first through fifth lens distortion compensation regions 130a, 130b, 130c, 130d, and 130e arranged in a concentric circle shape to compensate brightness non-uniformity of the structured light L. The shape of the first through fifth lens distortion compensation regions 130a, 130b, 130c, 130d, and 130e may be determined according to the characteristics of the lens 150 regardless of the shape of the outline of the pattern mask 130. Accordingly, when the lenses 150 used for the pattern mask 130 of FIG. 2 and the pattern mask 130 of FIG. 13 are the same, the shapes of the first through fifth lens distortion compensation regions 130a, 130b, 130c, 130d, and 130e in the pattern mask 130 having a shape depicted in FIG. 2 and the pattern mask 130 having a shape depicted in FIG. 13 may be the same.

Figure 15:
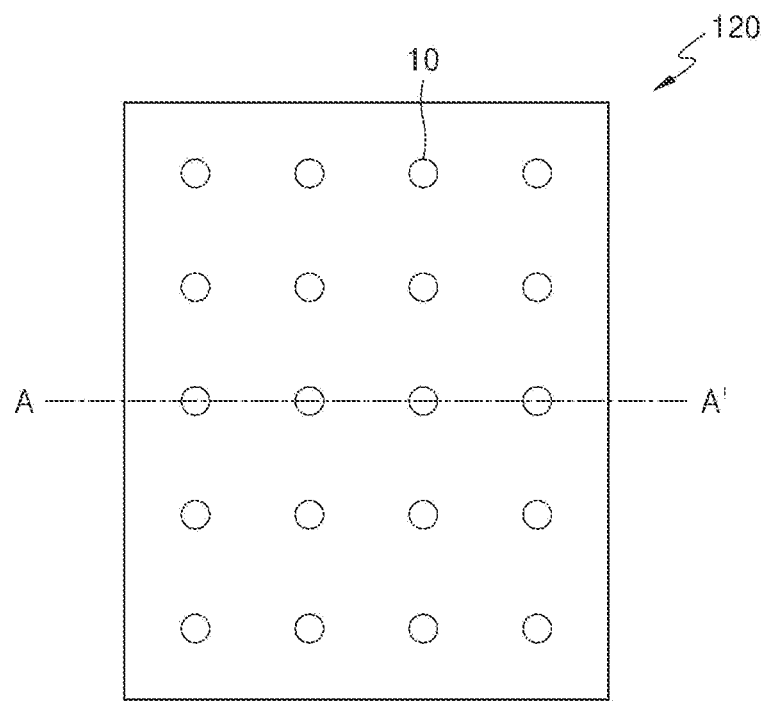
FIG. 15 is a plan view of an arrangement of light-emitting elements in an illuminator employed in the structured light projector of FIG. 1.

FIG. 15 is a plan view of an arrangement of light-emitting elements 10 arranged in the illuminator 120 employed in the structured light projector 100 of FIG. 1. Referring to FIG. 15, the illuminator 120 may include the plurality of light-emitting elements 10 arranged in a two dimensional (2D) array. The light-emitting elements 10 may be laser diodes that emit laser light. For example, the light-emitting elements 10 may be vertical cavity surface emitting lasers (VCSELs). When the light-emitting elements 10 are VCSELs, the light-emitting elements 10 may include an active layer including a group III-V semiconductor material or a group II-VI semiconductor material and having a multi-quantum well structure. However, the light-emitting elements 10 are not limited to VCSELs, and may be other layer diodes or light-emitting diodes besides the VCSELs.

The light-emitting elements 10 may emit laser light of approximately 850 nm or 940 nm, or light of a wavelength band of near infrared ray. However, a wavelength of light emitted from the light-emitting elements 10 is not limited thereto, and the light-emitting elements 10 may emit light of a wavelength band suitable for an application that uses structured light.

Figure 16:
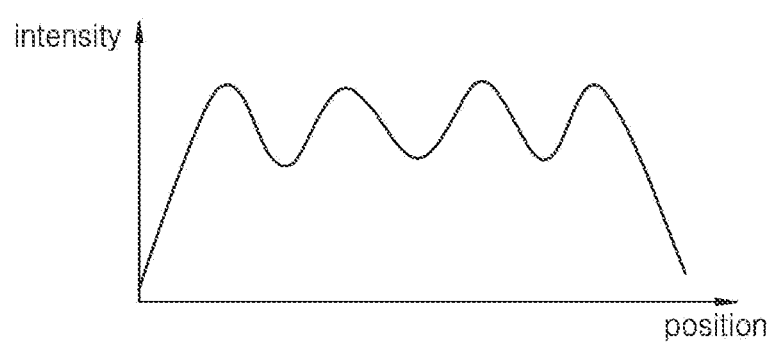
FIG. 16 is a graph showing an example of brightness non-uniformity of structured light by the illuminator of FIG. 15.

As depicted in FIG. 15, when the illuminator 120 includes the light-emitting elements 10 that are arranged in a 2D array, illumination light provided from the illuminator 120 may not be uniform. In this example, the brightness of structured light formed by non-uniform illumination light transmitting through the pattern mask 130 may not be uniform. For example, FIG. 16 is a graph showing an example of brightness non-uniformity of structured light projected based on the illumination light emitted by the illuminator 120 of FIG. 15. FIG. 16 shows brightness at a cross-section of the structured light corresponding to the cross-section of A-A' of the illuminator 120 of FIG. 15. As depicted in FIG. 16, the brightness is the lowest at both edges of the structured light, and a pattern of bright and dark is repeatedly displayed between the edges of the structured light. When the structured light is viewed on a plan view, the pattern of bright and dark may be displayed in a 2D array.

In order to compensate for the brightness non-uniformity of the illumination light, the pattern mask 130 may include a plurality of illumination light non-uniformity compensation regions. In the illumination light non-uniformity compensation regions of the pattern mask 130, a pattern width of the light shielding patterns 131 and a slit width of the light transmitting slits 132 may be controlled depending on the brightness of the illumination light. For example, FIG. 17 is a graph showing an example of changing a slit width of the pattern mask 130 to compensate brightness non-uniformity of structured light by the illuminator 120, and FIG. 18 is a graph showing the change of brightness, based on the intensity, of structured light, the brightness non-uniformity of which is compensated through changing a slit width of the pattern mask 130.

Figure 17:
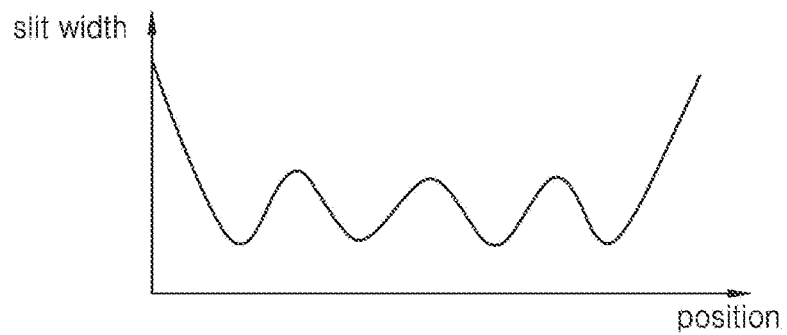
FIG. 17 is a graph showing an example of changing a slit width of a pattern mask for compensating brightness non-uniformity of structured light due to distortion by an illuminator.
Figure 18:
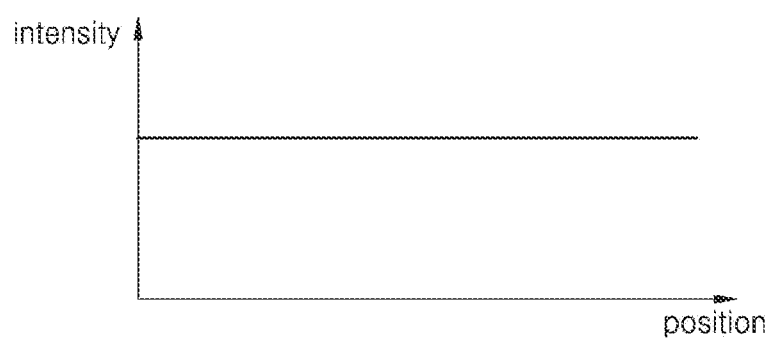
FIG. 18 is a graph showing the change of brightness of structured light, the brightness non-uniformity of which is compensated through changing a slit width of a pattern mask.

As depicted in FIG. 17, the slit width of the light transmitting slits 132 is formed to be the greatest at edges of the pattern mask 130 facing edges of the illuminator 120. The slit width of the light transmitting slits 132 may be increased or reduced as a complementary pattern with a brightness pattern of the illumination light in an inner side of the pattern mask 130 corresponding to an inner side of the illuminator 120. Accordingly, the transmittance of the pattern mask 130 may be reduced in a region of the pattern mask 130 where brighter illumination light is incident, and the transmittance of the pattern mask 130 may be increased in a region of the pattern mask 130 where darker illumination light is incident. The degree of increasing or reducing the slit width of the light transmitting slits 132 may be determined depending on the brightness of the illumination light entering the pattern mask 130. As a result, as depicted in FIG. 18, the brightness of the final structured light projected from the pattern mask 130 may be uniform over an entire region of the structured light.

Figure 19:
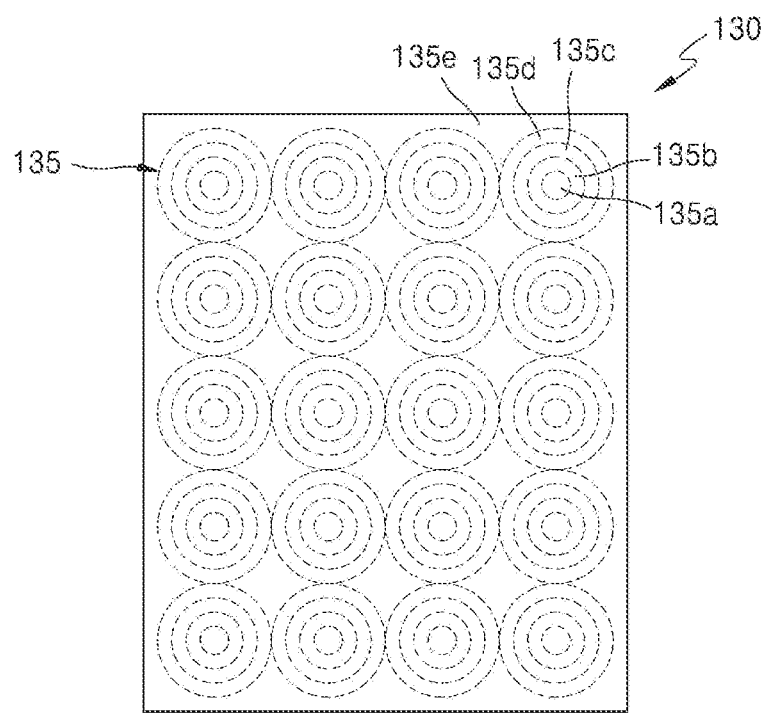
FIG. 19 is a plan view of an example of a pattern mask for compensating brightness non-uniformity of structured light by an illuminator.

FIG. 19 is a plan view of an example of the pattern mask 130 to compensate brightness non-uniformity of structured light by the illuminator 120. Referring to FIG. 19, the pattern mask 130 may include a plurality of illumination light non-uniformity compensation regions 135 arranged in a 2D arrangement. The arrangement of the illumination light non-uniformity compensation regions 135 may be determined according to the non-uniformity pattern of illumination light. Also, each of the illumination light non-uniformity compensation regions 135 may include first illumination light non-uniformity compensation sub-region 135a, second illumination light non-uniformity compensation sub-region 135b, third illumination light non-uniformity compensation sub-region 135c, fourth illumination light non-uniformity compensation sub-region 135d, and fifth illumination light non-uniformity compensation sub-region 135e arranged in a concentric circle shape. In FIG. 19, five illumination light non-uniformity compensation sub-regions, that is, the first through fifth illumination light non-uniformity compensation sub-regions 135a, 135b, 135c, 135d, and 135e are depicted as an example. However, the number of illumination light non-uniformity compensation sub-regions are not limited thereto, and may be variously selected according to the degree of the non-uniformity of the illumination light emitted by the illuminator 120. Of the first through fifth illumination light non-uniformity compensation sub-regions 135a, 135b, 135c, 135d, and 135e, the first illumination light non-uniformity compensation sub-region 135a, which is arranged at the innermost area of each of the illumination light non-uniformity compensation regions 135 is arranged facing the brightest region of the illumination light entering the pattern mask 130. The second through fifth illumination light non-uniformity compensation sub-regions 135b, 135c, 135d, and 135e may be sequentially arranged surrounding the first illumination light non-uniformity compensation sub-region 135a in a concentric circle shape.

A plurality of light shielding patterns 131 and a plurality of light transmitting slits 132 may be arranged in the first through fifth illumination light non-uniformity compensation sub-regions 135a, 135b, 135c, 135d, and 135e. In order to compensate for the brightness non-uniformity of the illumination light, the first through fifth illumination light non-uniformity compensation sub-regions 135a, 135b, 135c, 135d, and 135e may have optical transmittances different from each other. For example, the transmittance of the first illumination light non-uniformity compensation sub-region 135a may be the lowest, and the transmittance of the first through fifth illumination light non-uniformity compensation sub-regions 135b, 135c, 135d, and 135e may be gradually increased from the second illumination light non-uniformity compensation sub-region 135b towards the fifth illumination light non-uniformity compensation sub-region 135e. To change the transmittance, the pattern widths of the light shielding patterns 131 and the slit widths of the light transmitting slits 132 may be different from each other in the first through fifth illumination light non-uniformity compensation sub-regions 135a, 135b, 135c, 135d, and 135e. For example, the pattern width of the light shielding patterns 131 may be gradually reduced and the slit width of the light transmitting slits 132 may be gradually increased from the first illumination light non-uniformity compensation sub-region 135a towards the fifth illumination light non-uniformity compensation sub-region 135e.

In detail, the pattern width of the light shielding patterns 131 arranged in the first illumination light non-uniformity compensation sub-region 135a that is arranged at the innermost area of the illumination light non-uniformity compensation regions 135 may be greater than that of the light shielding patterns 131 arranged in the second illumination light non-uniformity compensation sub-region 135b. On the other hand, the slit width of the light transmitting slits 132 arranged in the first illumination light non-uniformity compensation sub-region 135a is less than that of the slit width of the light transmitting slits 132 arranged in the second illumination light non-uniformity compensation sub-region 135b. Accordingly, a ratio of an area of the light transmitting slits 132 with respect to an entire area of the light shielding patterns 131 in the second illumination light non-uniformity compensation sub-region 135b is greater than a ratio of an area of the light transmitting slits 132 with respect to an entire area of the light shielding patterns 131 in the first illumination light non-uniformity compensation sub-region 135a, and thus, the transmittance of the second illumination light non-uniformity compensation sub-region 135b is greater than that of the first illumination light non-uniformity compensation sub-region 135a.

Figure 20:
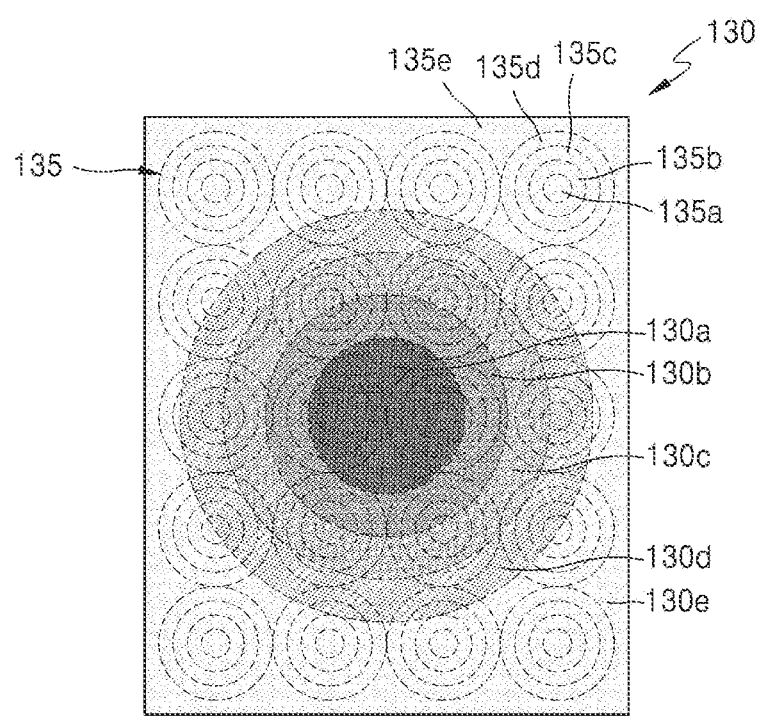
FIG. 20 is a plan view of an example of a pattern mask for compensating brightness non-uniformity of structured light due to distortion by a lens and for compensating brightness non-uniformity of structured light due to distortion by an illuminator.

Also, the first through fifth lens distortion compensation regions 130a, 130b, 130c, 130d, and 130e of the pattern mask 130 of FIG. 2 and the illumination light non-uniformity compensation regions 135 of FIG. 19 may overlap each other. For example, FIG. 20 is a plan view of an example of the pattern mask 130 to compensate brightness non-uniformity of structured light due to distortion by the lens 150 and to compensate brightness non-uniformity of structured light by the illuminator 120. Referring to FIG. 20, the first through fifth lens distortion compensation regions 130a, 130b, 130c, 130d, and 130e are arranged in a concentric circle shape in a central region of the pattern mask 130. Also, a plurality of illumination light non-uniformity compensation regions 135 are arranged over the entire region of the pattern mask 130 in a 2D arrangement. Each of the illumination light non-uniformity compensation regions 135 may include the first through fifth illumination light non-uniformity compensation sub-regions 135a, 135b, 135c, 135d, and 135e. The first through fifth illumination light non-uniformity compensation sub-regions 135a, 135b, 135c, 135d, and 135e and the first through fifth lens distortion compensation regions 130a, 130b, 130c, 130d, and 130e may overlap each other.

In this example, a relationship between the relative size between the pattern width of the light shielding patterns 131 and the slit width of the light transmitting slits 132 in the first through fifth lens distortion compensation regions 130a, 130b, 130c, 130d, and 130e and relationship between the relative size between the pattern width of the light shielding patterns 131 and the slit width of the light transmitting slits 132 in the first through fifth illumination light non-uniformity compensation sub-regions 135a, 135b, 135c, 135d, and 135e may be similarly applied. For example, the first through fifth illumination light non-uniformity compensation sub-regions 135a, 135b, 135c, 135d, and 135e may be partly arranged in the first lens distortion compensation region 130a. In this example, the pattern width of the light shielding patterns 131 at a location where the first lens distortion compensation region 130a overlaps the first illumination light non-uniformity compensation sub-region 135a may be greater than that of the light shielding patterns 131 at a location where the first lens distortion compensation region 130a overlaps the second illumination light non-uniformity compensation sub-region 135b. In other words, the slit width of the light transmitting slits 132 at a location where the first lens distortion compensation region 130a overlaps the first illumination light non-uniformity compensation sub-regions 135a may be less than that of the light transmitting slits 132 at a location where the first lens distortion compensation region 130a overlaps the second illumination light non-uniformity compensation sub-region 135b.

The pattern width of the light shielding patterns 131 at a location where the first lens distortion compensation region 130a overlaps the second illumination light non-uniformity compensation sub-region 135b may be greater than that of the light shielding patterns 131 at a location where the first lens distortion compensation region 130a overlaps the third illumination light non-uniformity compensation sub-region 135c. Also, the pattern width of the light shielding patterns 131 at a location where the first lens distortion compensation region 130a overlaps the first illumination light non-uniformity compensation sub-region 135a may be greater than that of the light shielding patterns 131 at a location where the second lens distortion compensation region 130b overlaps the first illumination light non-uniformity compensation sub-region 135a.

Also, the first through fifth illumination light non-uniformity compensation sub-regions 135a, 135b, 135c, 135d, and 135e may be partly arranged in the second lens distortion compensation region 130b. In this example, the pattern width of the light shielding patterns 131 at a location where the second lens distortion compensation region 130b overlaps the first illumination light non-uniformity compensation sub-region 135a may be greater than that of the light shielding patterns 131 at a location where the second lens distortion compensation region 130b overlaps the second illumination light non-uniformity compensation sub-region 135b. In other words, the slit width of the light transmitting slits 132 at a location where the second lens distortion compensation region 130b overlaps the first illumination light non-uniformity compensation sub-regions 135a may be less than that of the light transmitting slits 132 at a location where the second lens distortion compensation region 130b overlaps the second illumination light non-uniformity compensation sub-region 135b.

As a result, among a plurality of locations where the first through fifth lens distortion compensation regions 130a, 130b, 130c, 130d, and 130e overlap the first through fifth illumination light non-uniformity compensation sub-regions 135a, 135b, 135c, 135d, and 135e, the pattern width of the light shielding patterns 131 is the greatest and the slit width of the light transmitting slits 132 is the smallest at locations where the first lens distortion compensation region 130a overlaps the first illumination light non-uniformity compensation sub-region 135a, and the pattern width of the light shielding patterns 131 may be the smallest and the slit width of the light transmitting slits 132 is the greatest at locations where the fifth lens distortion compensation region 130e overlaps the fifth illumination light non-uniformity compensation sub-region 135e.

The structured light projector 100 having the example structures described above may project structured light having a relatively uniform brightness despite distortions of the illumination light emitted by the illuminator 120 and the lens 150. The structured light projector 100 may be employed in various electronic apparatuses. For example, the structured light projector 100 may be employed in a three dimensional (3D) object recognition apparatus. Since the structured light projector 100 provides structured light having highly uniform brightness, the precision of 3D sensing, motion detection, etc. of the 3D object recognition apparatus may be increased.

Figure 21:
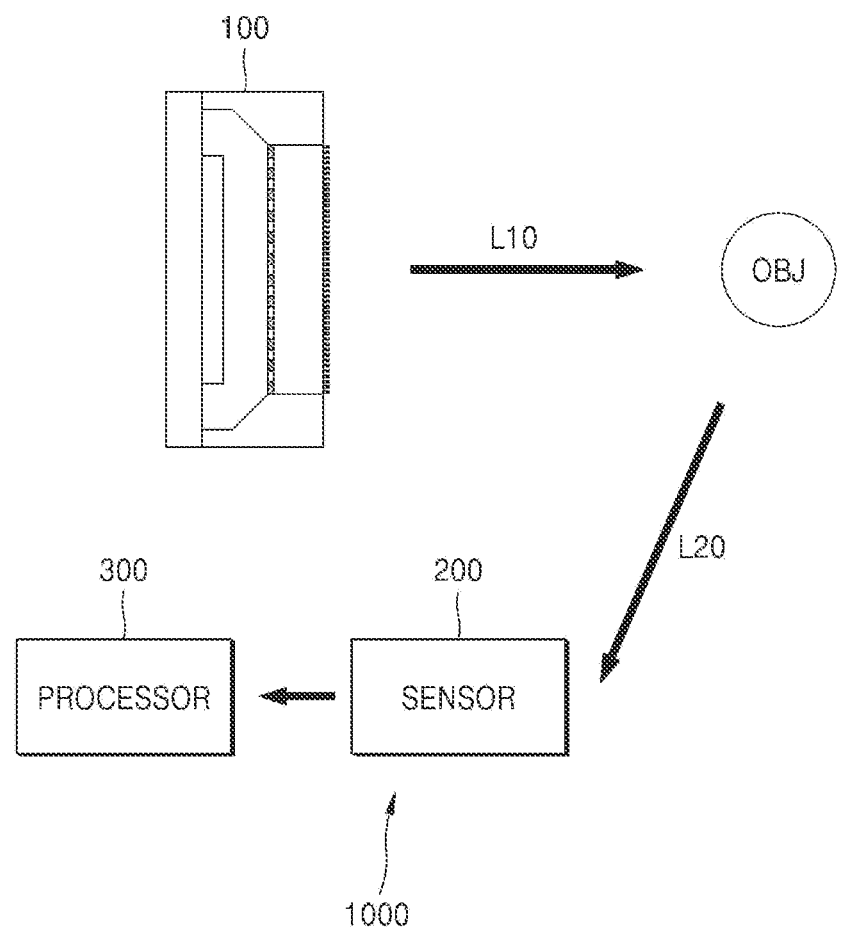
FIG. 21 is a block diagram showing a schematic structure of an electronic apparatus according to an example embodiment.

For example, FIG. 21 is a block diagram showing a schematic structure of an electronic apparatus 1000 according to an example embodiment. Referring to FIG. 21, the electronic apparatus 1000 may include the structured light projector 100 configured to project structured light L10 onto an object OBJ, a sensor 200 configured to receive light L20 reflected by the object OBJ, and a processor 300 configured to perform a computation for obtaining shape information of the object OBJ from the light L20 received by the sensor 200. Also, the sensor 200 may include an array of light detection elements. The sensor 200 may further include a spectral element for analyzing light reflected by the object OBJ in each wavelength.

The processor 300 may obtain depth information of the object OBJ by comparing the structured light L10 projected onto the object OBJ to the structured light L20 reflected by the object OBJ and may analyze a 3D shape, location, motion, etc. of the object OBJ from the depth information. The structured light L10 projected from the structured light projector 100 may be a mathematically coded pattern, and thus, the structured light L10 uniquely has an angle and direction of rays of light and has a locational coordinate of bright-and-dark points reaching a predetermined focus plane. When the pattern is reflected by the object OBJ having a 3D shape, the pattern of the reflected structured light L20 may have a changed shape from the projected structured light L10. Thus, depth information of the object OBJ may be extracted by comparing the patterns and tracing the patterns in each of the coordinates, and, from this result, 3D depth information related to the shape and motion of the object OBJ may be extracted. The processor 300 may generally control an operation of the electronic apparatus 1000, for example, the processor 300 may drive a light source included in the structured light projector 100 or control the operation of the sensor 200.

The electronic apparatus 1000 may further include a memory, and the memory may store a programmed computation module so that the processor 300 performs a computation for extracting the 3D information described above.

Optical elements for controlling a travelling direction of the structured light L10 emitted from the structured light projector 100 towards the object OBJ or for modulating the structured light L10 in addition to the travelling direction control may further be arranged between the structured light projector 100 and the object OBJ.

A computation result, that is, information with respect to the shape and location of the object OBJ, may be transmitted to other units or other electronic apparatuses. For example, the information may be used in other application modules stored in the memory. The other electronic apparatus to which the result is transmitted may be a display or a printer that outputs the result. Besides the above, the other electronic apparatus may be autonomous driven equipment, such as driverless cars, autonomous cars, robots, drones, smart phones, smart watches, mobile phones, personal digital assistants (PDAs), laptops, personal computers (PCs), various wearable equipment, other mobile or non-mobile computing devices, and internet of things (IoTs), but is not limited thereto.

The electronic apparatus 1000 may be autonomous driven equipment, such as driverless cars, autonomous cars, robots, and drones, may be portable communication devices, smart phones, smart watches, mobile phones, PDAs, laptops, PCs, various wearable equipment, other mobile or non-mobile computing devices, and IoTs, and the electronic apparatus 1000 is not limited thereto.

In the electronic apparatus 1000 according to the embodiments described above, methods realized by a software module or algorithm are computer-readable code or program commands and may be stored on a non-transitory computer readable recording medium. Here, the non-transitory computer readable recording medium may include magnetic storage media (e.g., read-only memory (ROM), random-access memory (RAM), floppy disks, hard disks, etc.), optical recording media (e.g., CD-ROMs or DVDs). The non-transitory computer readable recording medium may also be distributed over network-coupled computer systems so that the computer readable code is stored and executed in a distributed fashion. The non-transitory computer readable recording medium may be readable by a computer, stored in a memory, and executed on a process.

While example embodiments of structured light projectors and electronic apparatus including the same have been described in detail with reference to accompanying drawings, it will be understood by those of ordinary skill in the art that various changes in form and details may be made therein without departing from the spirit and scope of the disclosure. Therefore, the example embodiments should be considered in descriptive sense only and not for purposes of limitation. The scope of the disclosure is defined not by the detailed description but by the appended claims, and all differences within the scope will be construed as being included in the disclosure.

What is claimed is:

1. A structured light projector comprising:
an illuminator configured to emit illumination light;
a pattern mask configured to generate structured light by partially transmitting the illumination light; and
a lens configured to transmit the structured light,
wherein the pattern mask comprises:
a first lens distortion compensation region comprising a plurality of first light shielding patterns, the first lens distortion compensation region having a first transmittance; and
a second lens distortion compensation region comprising a plurality of second light shielding patterns, the second lens distortion compensation region having a second transmittance higher than the first transmittance,
wherein the first lens distortion compensation region and the second lens distortion compensation region are disposed on a same surface, and the second lens distortion compensation region is disposed to surround a circumference of the first lens distortion compensation region,
wherein the first lens distortion compensation region faces a central region of the lens, and
wherein each of the plurality of first light shielding patterns and each of the plurality of second light shielding patterns are opaque.

2. The structured light projector of claim 1, wherein the first lens distortion compensation region is disposed opposite to a central region of the lens.

3. The structured light projector of claim 1, wherein the plurality of first light shielding patterns have a first pattern width and the plurality of second light shielding patterns have a second pattern width that is less than the first pattern width.

4. The structured light projector of claim 3, wherein the first lens distortion compensation region comprises a first light transmitting slit configured to transmit the illumination light, the first light transmitting slit having a first slit width, and
the second lens distortion compensation region comprises a second light transmitting slit configured to transmit the illumination light, the second light transmitting slit having a second slit width.

5. The structured light projector of claim 4, wherein the second slit width of the second light transmitting slit is greater than the first slit width of the first light transmitting slit.

6. The structured light projector of claim 4, wherein a ratio of an area of the second light transmitting slit with respect to an entire area of the plurality of second light shielding patterns in the second lens distortion compensation region is greater than a ratio of an area of the first light transmitting slit with respect to an entire area of the plurality of first light shielding patterns in the first lens distortion compensation region.

7. The structured light projector of claim 3, wherein the pattern mask further comprises a third lens distortion compensation region surrounding the second lens distortion compensation region, wherein the third lens distortion compensation region comprising a plurality of third light shielding patterns,
wherein the third lens distortion compensation region has a third transmittance higher than the second transmittance.

8. The structured light projector of claim 7, wherein the plurality of third light shielding patterns have a third pattern width that is less than the second pattern width.

9. The structured light projector of claim 8, wherein the first lens distortion compensation region, the second lens distortion compensation region, and the third lens distortion compensation region are sequentially disposed in concentric circle shapes.

10. The structured light projector of claim 8, wherein the first lens distortion compensation region comprises a first light transmitting slit configured to transmit the illumination light, the second lens distortion compensation region comprises a second light transmitting slit configured to transmit the illumination light, and the third lens distortion compensation region comprises a third light transmitting slit configured to transmit the illumination light.

11. The structured light projector of claim 10, wherein a ratio of an area of the second light transmitting slit with respect to an entire area of the plurality of second light shielding patterns in the second lens distortion compensation region is greater than a ratio of an area of the first light transmitting slit with respect to an entire area of the plurality of first light shielding patterns in the first lens distortion compensation region, and
a ratio of an area of the third light transmitting slit with respect to an entire area of the plurality of third light shielding patterns in the third lens distortion compensation region is greater than the ratio of an area of the second light transmitting slit with respect to an entire area of the plurality of second light shielding patterns in the second lens distortion compensation region.

12. The structured light projector of claim 1, wherein the illuminator comprises a plurality of light-emitting elements disposed in a two dimensional array.

13. The structured light projector of claim 12, wherein the pattern mask further comprises a plurality of illumination light non-uniformity compensation regions configured to control brightness of the structured light projected by the pattern mask to be uniform.

14. The structured light projector of claim 13, wherein the plurality of illumination light non-uniformity compensation regions are arranged two-dimensionally on the pattern mask.

15. The structured light projector of claim 13, wherein each of the illumination light non-uniformity compensation regions comprises:
a first illumination light non-uniformity compensation sub-region opposite to a brightest region of the illumination light; and
a second illumination light non-uniformity compensation sub-region surrounding the first illumination light non-uniformity compensation sub-region.

16. The structured light projector of claim 15, wherein the first illumination light non-uniformity compensation sub-region and the second illumination light non-uniformity compensation sub-region overlap the first lens distortion compensation region and the second lens distortion compensation region, respectively.

17. The structured light projector of claim 15, wherein the first illumination light non-uniformity compensation sub-region comprises a plurality of third light shielding patterns, and the second illumination light non-uniformity compensation sub-region comprises a plurality of fourth light shielding patterns, and
the first illumination light non-uniformity compensation sub-region has a third transmittance and the second illumination light non-uniformity compensation sub-region has a fourth transmittance that is higher than the third transmittance.

18. The structured light projector of claim 17, wherein the first illumination light non-uniformity compensation sub-region comprises a plurality of third light transmitting slits configured to transmit the illumination light, the plurality of third light transmitting slits having a third slit width,
the second illumination light non-uniformity compensation sub-region comprises a plurality of fourth light transmitting slits configured to transmit the illumination light, the fourth light transmitting slits having a fourth slit width, and
the fourth slit width of the plurality of fourth light transmitting slits disposed in the second illumination light non-uniformity compensation sub-region is greater than the third slit width of the plurality of third light transmitting slits disposed in the first illumination light non-uniformity compensation sub-region.

19. The structured light projector of claim 18, wherein a ratio of an area of the fourth light transmitting slits in the second illumination light non-uniformity compensation sub-region with respect to an entire area of the plurality of fourth light shielding patterns arranged in the second illumination light non-uniformity compensation sub-region is greater than a ratio of an area of the third light transmitting slits in the first illumination light non-uniformity compensation sub-region with respect to an entire area of the plurality of third light shielding patterns arranged in the first illumination light non-uniformity compensation sub-region.

20. An electronic apparatus comprising:
a structured light projector;
a sensor configured to receive light reflected by an object which is irradiated with light emitted by the structured light projector; and
a processor configured to obtain shape information of the object based on the light received by the sensor,
wherein the structured light projector comprises:
an illuminator configured to emit illumination light;
a pattern mask configured to generate structured light by partially transmitting the illumination light; and
a lens configured to transmit the structured light,
wherein the pattern mask comprises:
a first lens distortion compensation region comprising a plurality of first light shielding patterns, the first lens distortion compensation region having a first transmittance; and
a second lens distortion compensation region comprising a plurality of second light shielding patterns, the second lens distortion compensation region having a second transmittance higher than the first transmittance,
wherein the first lens distortion compensation region and the second lens distortion compensation region are disposed on a same surface, and the second lens distortion compensation region is disposed to surround a circumference of the first lens distortion compensation region,
wherein the first lens distortion compensation region faces a central region of the lens, and
wherein each of the plurality of first light shielding patterns and each of the plurality of second light shielding patterns are opaque.

* * * * *